(12) United States Patent
Nishikubo

(10) Patent No.: US 7,908,748 B2
(45) Date of Patent: Mar. 22, 2011

(54) RACK AND PINION TYPE STEERING DEVICE AND METHOD OF MANUFACTURING THE SAME

(75) Inventor: Hiroki Nishikubo, Maebashi (JP)

(73) Assignee: NSK Ltd., Tokyo (JP)

( * ) Notice: Subject to any disclaimer, the term of this patent is extended or adjusted under 35 U.S.C. 154(b) by 361 days.

(21) Appl. No.: 12/091,813

(22) PCT Filed: Nov. 1, 2006

(86) PCT No.: PCT/JP2006/322321
§ 371 (c)(1),
(2), (4) Date: Apr. 28, 2008

(87) PCT Pub. No.: WO2007/052829
PCT Pub. Date: May 10, 2007

(65) Prior Publication Data
US 2009/0120226 A1 May 14, 2009

(30) Foreign Application Priority Data
Nov. 4, 2005 (JP) .................. 2005-320364

(51) Int. Cl.
*B62D 3/12* (2006.01)
(52) U.S. Cl. ............. 29/893.32; 29/893.31; 29/893.1; 29/445; 29/450

(58) Field of Classification Search ............. 29/893.32, 29/893.31, 893.1, 895.21, 895.211, 525, 29/897.2, 505, 445, 450
See application file for complete search history.

(56) References Cited

U.S. PATENT DOCUMENTS

| | | | | |
|---|---|---|---|---|
| 4,939,947 A * | 7/1990 | Toyoshima et al. | ............. | 74/422 |
| 5,718,149 A * | 2/1998 | Phillips | ............. | 74/422 |
| 5,906,138 A * | 5/1999 | Kostrzewa | ............. | 74/498 |
| 6,067,713 A * | 5/2000 | Bugosh | ............. | 29/893.1 |
| 6,467,366 B1 * | 10/2002 | Gierc | ............. | 74/422 |

FOREIGN PATENT DOCUMENTS

| | | |
|---|---|---|
| JP | 5-80957 U | 11/1993 |
| JP | 11-91591 A | 4/1999 |
| JP | 2004-34829 A | 2/2004 |
| WO | WO 2007/052829 A1 | 5/2007 |

* cited by examiner

*Primary Examiner* — David P Bryant
*Assistant Examiner* — Christopher Besler
(74) *Attorney, Agent, or Firm* — Sidley Austin LLP

(57) ABSTRACT

A rack and pinion type steering device capable of reducing contact surface pressure, suppressing the wear of contact surfaces, and preventing a rack guide movable amount from being excessively increased by increasing the contact area of the outer peripheral surface of roller on the outer peripheral surface of a rack shaft in a rack guide, and method of manufacturing the steering gear.

10 Claims, 7 Drawing Sheets

PRIOR ART

RACK AND PINION TYPE STEERING DEVICE AND METHOD OF MANUFACTURING THE SAME

RELATED APPLICATIONS

This application is a National Stage of International Application No. PCT/JP2006/322321, filed Nov. 1, 2006, which is based on Japanese Patent Application No. 2005-320364, the entire contents of which is incorporated herein by reference.

TECHNICAL FIELD

The present invention relates to a rack and pinion type steering device for a vehicle and a method of manufacturing the steering device.

BACKGROUND ART

The rack and pinion type steering device for the vehicle is so designed as to transmit the rotation of a pinion to a rack that is meshed with the pinion to move a tie rod that is fitted to an end portion of the rack, and transmit the rotation to a steering unit that controls the direction of the tire wheels.

The rack and pinion type steering device of this type includes a rack guide that presses the back surface of a rack shaft in a meshing direction by the aid of an elastic body such as a spring so that the pinion and the rack are appropriately meshed with each other.

Also, the rack guide is of a slide type in which the rack shaft and the rack guide are brought in slide contact with each other, and of a rolling type in which the rack shaft is supported by a roller. The rolling type is so configured as to bear a pin that supports the roller by a pin insertion groove that is defined in a rack guide holder (refer to Japanese Laid Open Patent Publication No. 2004-034829).

FIG. 5 is a cross-sectional view for explaining an example of the configuration of a rack and pinion type steering device 100 having the above conventional rolling type rack guide, FIG. 6(a) is a partially cross-sectional view taken along a line A-A, FIG. 6(b) is a cross-sectional view taken along a line B-B of FIG. 5 from which a housing is omitted.

A rack and pinion type steering device 100 is so configured as to arrange a pinion shaft 104 and a rack shaft 105 in the interior of a housing 101. The pinion shaft 104 is rotationally supported by a ball bearing 102 and a needle bearing 103. The rack shaft 105 is so arranged as to be movable in the axial direction by the aid of a rack bush not shown. An end of the rack shaft 105 is coupled with a tie rod having a link unit that changes the direction of the tire wheels through a ball joint. A rack tooth 105a of the rack shaft 105 is meshed with a pinion tooth 104a of the pinion that is integrally formed with the above pinion shaft 104.

Further, a rack guide 106 is disposed at an opposite side of the pinion shaft 104 with respect to the rack shaft 105 in the interior of the housing 101. The rack guide 106 is so configured as to press the rack shaft 105 from the back surface to appropriately maintain a meshing state of the pinion tooth 104a with the rack tooth 105a.

The rack guide 106 is made up of a rack guide holder 107 that is totally formed in a substantially cylindrical shape, a pin 108 that is arranged in a pin support hole 107a which is defined in an inner space of the rack guide holder 107 in a direction orthogonal to the axial direction of the rack shaft 105, and a roller 110 having a needle bearing 108 pressed into a center portion thereof and having an outer peripheral surface formed in a hand drum shape.

The roller 110 is installed on the pin 108 and rotationally disposed in the inner space of the rack guide holder 107. The outer peripheral surface of the hand drum shape of the roller 110 is brought in rolling contact with the back surface of the rack shaft 105 (a surface at an opposite side of the meshed surface) so as to press the rack shaft 105 toward the meshed surface.

The housing 101 is equipped with a rack guide portion 111 having a cylindrical aperture that guides the rack guide holder 107, and the outer peripheral surface of the rack guide holder 107 is fitted with the rack guide portion 111. Also, a screw is formed in the inner surface of the rack guide portion 111 on a lower side (on an opposite side of the rack shaft 105) of the rack guide portion 111 of the housing 101, so as to be meshed with an adjustment screw 112.

The adjustment screw 112 is formed of a cylindrical member having a bottom. The adjustment screw 112 is so configured as to be meshed with the rack guide portion 111, and press the rack guide holder 107 toward the rack shaft 105 through a disc spring 113 interposed between the adjustment screw 112 and the rack guide holder 107. The screwing amount of the adjustment screw 112 is so adjusted as to appropriately adjust the meshing state of the rack tooth 105a with the pinion tooth 104a. The rack guide holder 107 can be displaced by the amount of elastic deformation of the disc spring 113.

The conventional rack guide described with reference to FIGS. 5, 6(a), and 6(b) suffers from the problems described below. That is, FIG. 7 is a diagram for explaining the cross-sectional configuration of the outer peripheral surface of the hand drum shape of the conventional roller 110. In the conventional rack guide, as shown in FIG. 7, the cross-sectional configuration of the hand drum shaped outer peripheral surface of the roller 110 is made up of curved surfaces R1 and R2 (R1 can be equal to R2) consisting of two circular arcs having the radius of curvature larger than the radius of curvature RR of the outer peripheral surface of the rack shaft 105. Therefore, the hand drum shaped outer peripheral surface of the roller 110 and the outer peripheral surface of the rack shaft 105 are brought in point contact with each other at two points A and B.

The reason is that the radius of curvatures R1 and R2 of the outer peripheral surface of the roller 110 and the radius of curvature RR of the outer peripheral surface of the rack shaft 105 cannot be manufactured in the entirely identical radius of curvature because of the tolerance (permissible error) in the manufacture.

However, when the roller 110 and the rack shaft 105 are brought in point contact with each other as described above, because an area of the contact portion is very small, an estrangement force that occurs when the pinion and the rack are meshed with each other is transmitted to the rack guide holder 107. Then, the contact portion of the roller 110 with the rack shaft 105 becomes high surface pressure, and the contact portion is liable to be worn.

As the countermeasure against the wear of the contact portion, it is general to increase the hardness of the contact portion, and in the above structure, there is proposed that the rack shaft is made of high carbon steel, and the roller is made of high carbon chromium bearing steel, and the rack shaft and the roller are subjected to a heat treatment to increase the hardness.

However, even if the hardness of the roller and the rack shaft is increased, the contact portion is high surface pressure without any change, and the wear cannot be completely suppressed. Also, the roller is deformed in the heat treatment, and the fluctuation of the roller becomes large with respect to the rotation center. When the vibration exists in the roller, the amount of elastic deformation of the disc spring (refer to FIG. 5) changes by the fluctuation amount due to the phase (rotational angle position) of the roller. As a result, since the movable amount of the rack guide changes, the fluctuation of the roller must be prevented as much as possible. For that reason, after the roller has been subjected to the heat treatment, the outer surface of the roller is ground so as to eliminate the fluctuation. However, the costs increase because the grinding process is conducted.

As described above, even if the hardness of the roller and the rack shaft is increased, the wear of the contact portion cannot be completely eliminated although the costs increase. As a result, there occur disadvantages such as an increase in the amount of elastic deformation of the disc spring or an increase in the movable amount of the rack guide.

Also, in the rack and pinion type steering device, when the rack guide movable amount increases, gear rattle (rattle noise) occurs. For that reason, an increase in the excessive rack guide movable amount must be avoided.

An object of the present invention is to solve the above disadvantages, that is, to suppress the wear of the contact portion of the roller with the rack shaft, eliminate an increase in the excessive rack guide movable amount, and prevent the rattle noise from occurring.

DISCLOSURE OF THE INVENTION

According to the present invention, there is provided a rack and pinion type steering device having a rack guide that includes a rack guide holder which is disposed to be movable toward a meshing direction of a rack and a pinion, and has a pin insertion groove formed in an interior thereof, and a roller which is rotatably installed on a pin which is disposed in the pin insertion groove of the rack guide holder, wherein an outer peripheral surface of the roller is formed around a rotating axis in a hand drum shape, and the outer peripheral surface of the hand drum shape has a configuration that comes in line contact with the outer peripheral surface on an opposite side of the meshed surface of the rack shaft and the pinion.

Then, the cross-sectional configuration of the hand drum shaped outer peripheral surface of the roller has a curvature identical with the curvature of the cross-sectional configuration of the outer peripheral surface on an opposite side of the meshed surface of the rack shaft with the pinion.

Also, according to the present invention, there is provided a method of manufacturing a rack and pinion type steering device having a rolling type rack guide which includes a rack guide holder that presses a back surface of a rack shaft toward a meshed surface of a rack and a pinion by the aid of a roller, and a roller having a hand drum shaped outer peripheral surface which is rotatably installed on a pin which is disposed in a pin insertion groove of the rack guide holder, wherein after the hand drum shaped outer peripheral surface of the roller is formed in a cross-sectional configuration of a curvature different from the curvature of the cross-sectional configuration of the outer peripheral surface on an opposite side of the meshed surface of the rack shaft with the pinion, the rack shaft is pressed toward the formed hand drum shaped outer peripheral surface to reciprocate the rack shaft in the axial direction so as to be plastically deformed while the roller rotates, and the hand drum shaped outer peripheral surface of the roller is formed in a configuration that comes in line contact with the outer peripheral surface on the opposite side of the meshed surface of the rack shaft.

In this case, it is possible that after the roller is formed in the hand drum shaped outer peripheral surface of a cross-sectional configuration having a curvature larger than the curvature of the cross-sectional configuration of the outer peripheral surface on an opposite side of the meshed surface of the rack shaft with the pinion, a surface hardening treatment is conducted, and the hand drum shaped outer peripheral surface is then plastically deformed into a configuration that comes in line contact with the outer peripheral surface on the opposite side of the meshed surface of the rack shaft.

In this case, it is possible that after the roller is formed in the hand drum shaped outer peripheral surface of a cross-sectional configuration having a curvature smaller than the curvature of the cross-sectional configuration of the outer peripheral surface on an opposite side of the meshed surface of the rack shaft with the pinion, a surface hardening treatment is conducted, and the hand drum shaped outer peripheral surface is then plastically deformed into a configuration that comes in line contact with the outer peripheral surface on the opposite side of the meshed surface of the rack shaft.

Also, it is possible that the plastic deformation of the hand drum shaped outer peripheral surface of the roller is conducted by pressing the rack guide toward the rack shaft.

Further, it is possible that the plastic deformation of the hand drum shaped outer peripheral surface of the roller is conducted by pressing the rack shaft toward the rack guide by applying a load to an end of the rack shaft.

BRIEF DESCRIPTION OF THE DRAWINGS

FIG. 6(*b*) is a cross-sectional view taken along a line B-B of FIG. 5.

DETAILED DESCRIPTION OF THE PREFERRED EMBODIMENTS

Here under, the preferred embodiments of the present invention will be described.

First Embodiment

Figure 1:
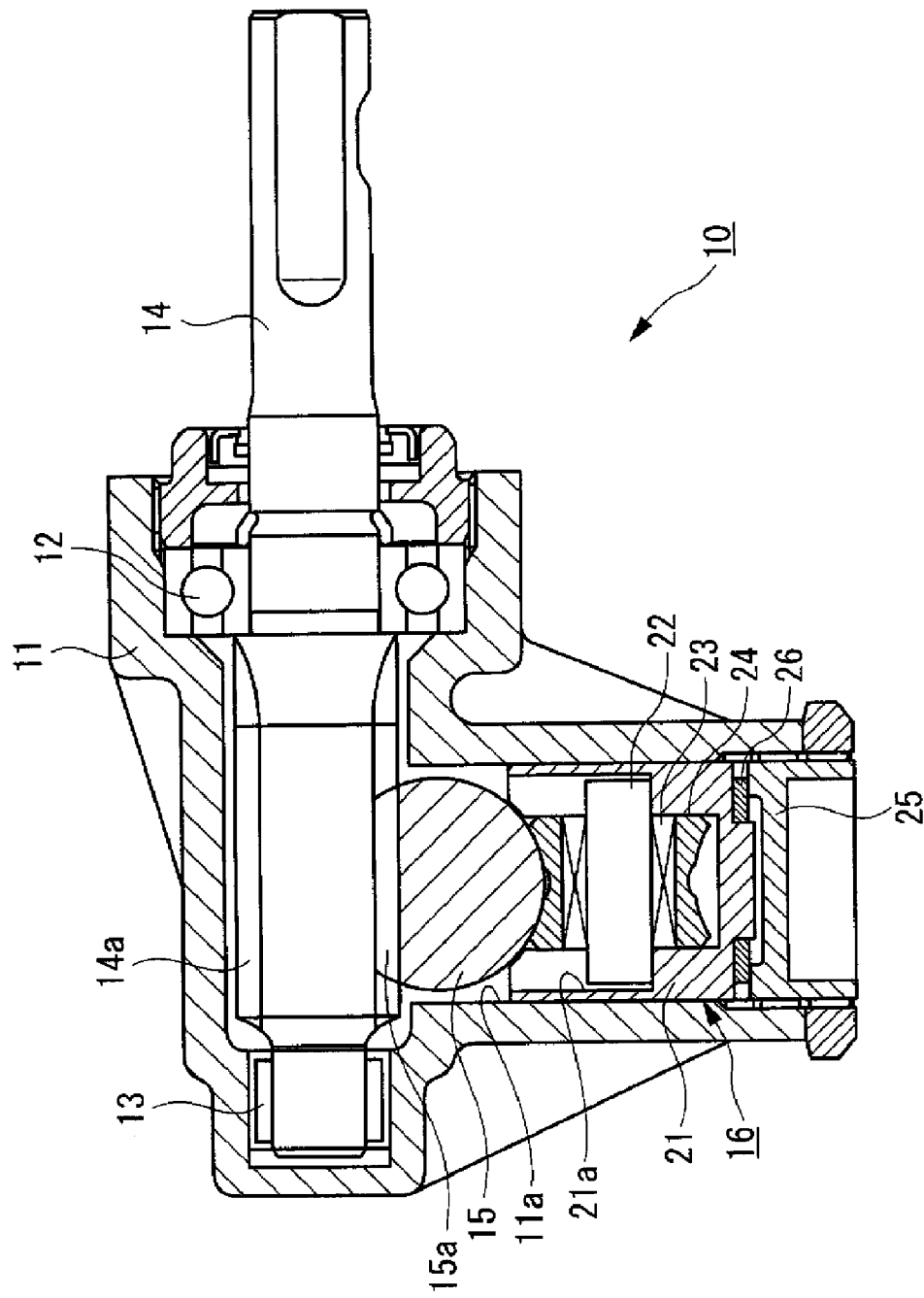
FIG. 1 is a cross-sectional view for explaining the configuration of a rack and pinion type steering device having a rack guide of a rolling type according to a first embodiment of the present invention.

FIG. 1 is a cross-sectional view for explaining the configuration of a rack and pinion type steering device 10 having a rack guide of a rolling type according to a first embodiment of the present invention.

The rack and pinion type steering device 10 is so configured as to arrange a pinion shaft 14 and a rack shaft 15 in the interior of a housing 11. The pinion shaft 14 is rotationally supported by a ball bearing 12 and a needle bearing 13. The rack shaft 15 is so arranged as to be movable in the axial direction by the aid of a rack bush not shown. An end of the rack shaft 15 is coupled with a tie rod having a link unit that changes the direction of the tire wheels through a ball joint not shown. A rack tooth 15a of the rack shaft 15 is meshed with a pinion tooth 14a of the pinion that is integrally formed with the above pinion shaft 14.

Further, a rack guide 16 is disposed at an opposite side of the pinion shaft 14 with respect to the rack shaft 15 in the interior of the housing 11. The rack guide 16 is so configured as to press the rack shaft 15 from the back surface to appropriately maintain a meshing state of the pinion tooth 14a with the rack tooth 15a.

The rack guide 16 is made up of a rack guide holder 21 that is totally formed in a substantially cylindrical shape, a pin 22 that is arranged in a pin support hole 21a which is defined in an inner space of the rack guide holder 21 in a direction orthogonal to the axial direction of the rack shaft 15, and a roller 24 having a needle bearing 23 pressed into a center portion thereof and having an outer peripheral surface formed in a hand drum shape.

The roller 24 is installed on the pin 22 and rotationally disposed in the inner space of the rack guide holder 21. The outer peripheral surface of the hand drum shape of the roller 24 is brought in rolling contact with the back surface of the rack shaft 15 (a surface at an opposite side of the meshed surface) so as to press the rack shaft 15 toward the meshed surface.

The housing 11 is equipped with a rack guide portion 11a having a cylindrical aperture that guides the rack guide holder 21, and the outer peripheral surface of the rack guide holder 21 is fitted with the rack guide portion 11a. Also, a screw is formed in the inner surface of the rack guide portion 11a on a lower side (on an opposite side of the rack shaft 15) of the rack guide portion 11a of the housing 11, so as to be meshed with an adjustment screw 25.

The adjustment screw 25 is formed of a cylindrical member having a bottom. The adjustment screw 25 is so configured as to be meshed with the rack guide portion 11a, and press the rack guide holder 21 toward the rack shaft 15 through a disc spring 26 interposed between the adjustment screw 25 and the rack guide holder 21. The screwing amount of the adjustment screw 25 is so adjusted as to appropriately adjust the meshing state of the rack tooth 15a with the pinion tooth 14a. The rack guide holder 21 can be displaced by the amount of the elastic deformation of the disc spring 26.

A description will be given of the configuration of the outer peripheral surface of the roller 24 and a method of forming the outer peripheral portion. The cross-sectional configuration of the outer peripheral surface of the roller 24 is identical with the cross-sectional configuration of the outer peripheral surface of the roller 110 in the conventional art described with reference to FIG. 7 in advance. That is, the cross-sectional configuration of the outer peripheral surface of the roller 24 is made up of curved surfaces consisting of two circular arcs having the radius of curvatures R1 and R2 (R1 can be equal to R2) which are larger than the radius of curvature RR of the cross-sectional configuration of the outer peripheral surface of the rack shaft 15.

A description will be given of a method of forming the outer peripheral surface of the roller 24. First, the configuration of the outer peripheral surface of the roller 24 is formed into an outer peripheral surface having the above cross-sectional configuration, that is, a cross-sectional configuration that consists of two circulate arcs. The outer peripheral surface is surface hardened by known appropriate means.

Subsequently, the pinion shaft 14, the rack shaft 15, and the rack guide holder 21 are assembled in the interior of the housing 11, and the adjustment screw 25 is fastened more than usual to supply an excessive load more than that originally supplied to the rack guide holder 21.

The rack shaft 15 is reciprocated in the axial direction under a state where the excessive load more than that originally supplied is supplied to the rack guide holder 21, thereby plastically deforming the outer peripheral surface of the roller 24 into the configuration of the outer peripheral surface of the rack shaft 15 so as to follow the outer peripheral surface of the rack shaft. The plastic deformation makes the cross-sectional configurations (radii R1 and R2) of the outer peripheral surface of the roller 24 coincide with the cross-sectional configuration (radius RR) of the outer peripheral surface of the rack shaft (R1=R2=RR) As a result, the outer peripheral surface of the roller 24 comes in line contact with the outer peripheral surface of the rack shaft with a high precision.

Figure 2:
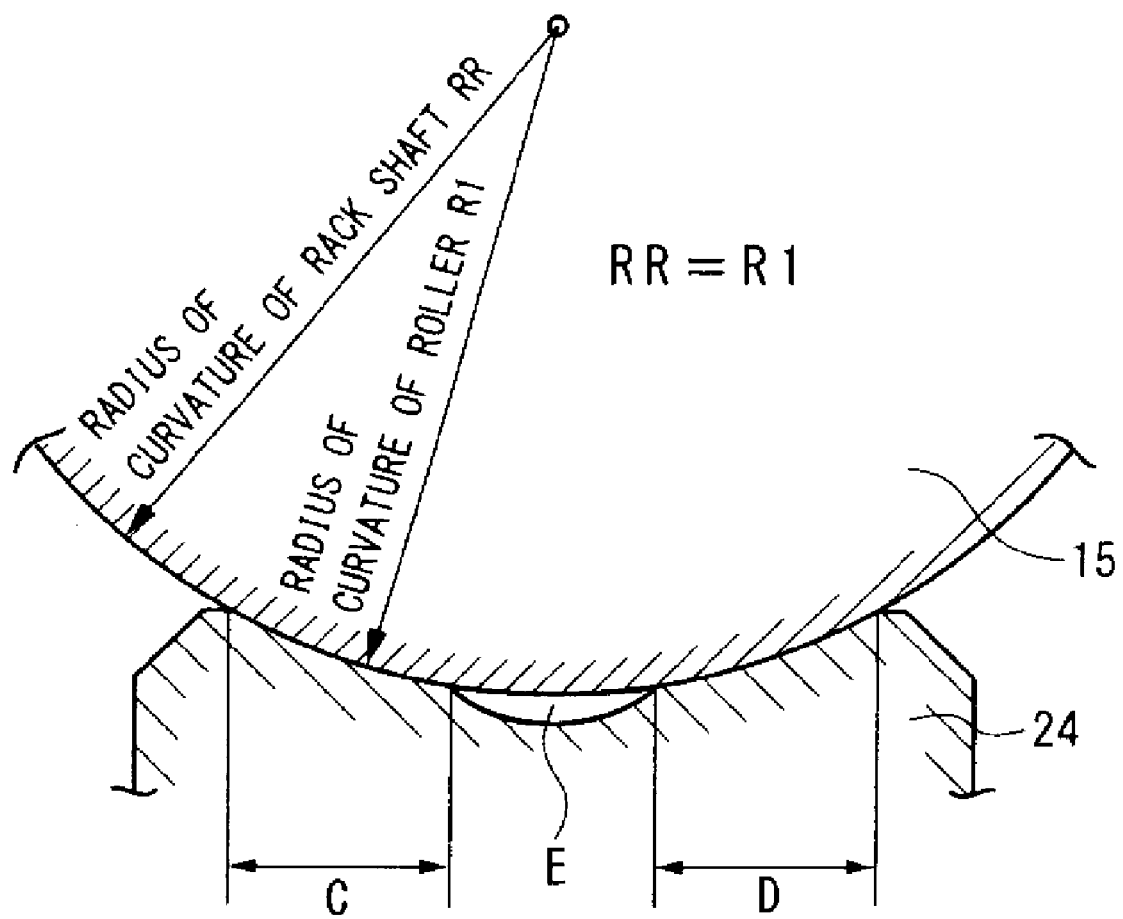
FIG. 2 is a diagram showing a cross-sectional configuration of the outer peripheral surface of a roller that is plastically deformed.

FIG. 2 is a diagram showing the cross-sectional configuration of the outer peripheral surface of the roller 24 that has been plastically deformed. The outer peripheral surface of the roller 24 and the outer peripheral surface of the rack shaft 15 come in line contact with each other in areas of portions C and D. A portion E is a groove that is defined in the roller 24 in advance.

The face hardening treatment of the outer peripheral surface of the above roller 24 is conducted by a method such as a known carburization quenching or a nitriding treatment. In this situation, it is desirable that the thickness of the hardened layer is about 0.1 to 0.6 mm, and it is undesirable that the hardened layer is too thick because plastic deformation is difficult.

According to the above configuration, the outer peripheral surface of the roller and the outer peripheral surface of the rack shaft come in line contact with each other, and the contact area increases, thereby making it possible to decrease the contact surface pressure. As a result, it is possible to suppress the wear of the contact surface, prevent an increase in the excessive rack guide movable amount, and prevent rattle noise from occurring.

Second Embodiment

A second embodiment is similar in the configuration to the rack and pinion type steering device 10 having the rack guide of the rolling type according to the first embodiment, and only the configuration of the outer peripheral surface of the roller 24 is different from that in the first embodiment. Accordingly, the configuration of the rack and pinion type steering device having the rack guide is omitted from the detailed description with FIG. 1 and its description, and only differences will be described.

Figure 3:
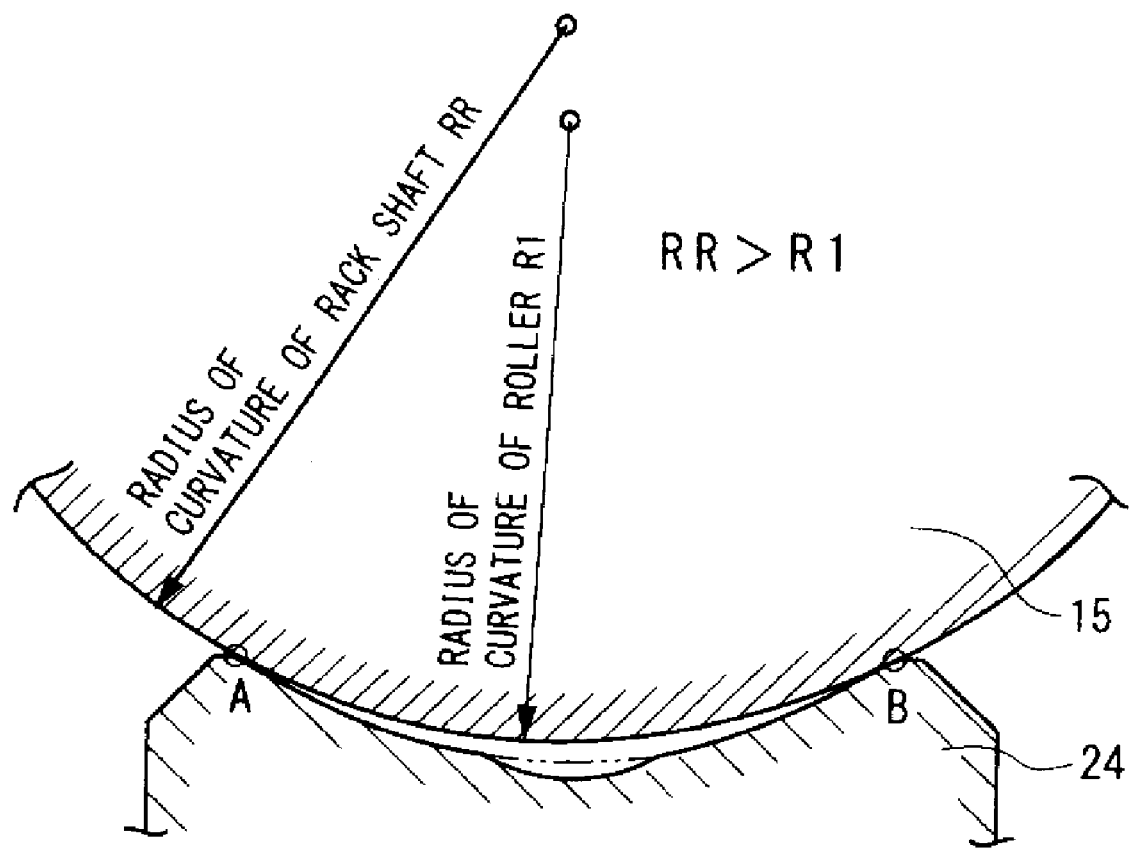
FIG. 3 is a diagram for explaining a cross-sectional configuration of the outer peripheral surface of the roller which has not yet been plastically deformed according to a second embodiment.

FIG. 3 is a diagram for explaining a cross-sectional configuration of the outer peripheral surface of the roller which has not yet been plastically deformed according to a second embodiment. In the second embodiment, the cross-sectional configuration of the outer peripheral surface of the roller 24 is formed into a curved surface having a radius of curvature R1 smaller than the radius of curvature RR which is the cross-sectional configuration of the outer peripheral surface of the rack shaft 15. For that reason, the outer ring of the roller 24 and the outer peripheral surface of the rack shaft 15 come in contact with each other at only points A and B.

In the second embodiment, the configuration of the outer peripheral surface of the roller 24 is formed into the cross-sectional configuration shown in FIG. 3, and the outer peripheral surface is face-hardened by known appropriate means.

Then, the pinion shaft 14, the rack shaft 15, and the rack guide holder 21 are assembled in the interior of the housing 11, and the adjustment screw 13 is fastened more than usual to supply an excessive load more than that originally supplied to the rack guide holder 21.

The rack shaft 15 is reciprocated in the axial direction under a state where the excessive load more than that originally supplied is supplied to the rack guide holder 21, thereby plastically deforming the outer peripheral surface of the roller 24 into the configuration of the outer peripheral surface of the rack shaft 15 so as to follow the outer peripheral surface of the rack shaft. The plastic deformation makes the cross-sectional configurations (radius R1) of the outer peripheral surface of the roller 24 coincide with the cross-sectional configuration (radius RR) of the outer peripheral surface of the rack shaft (R1=RR) As a result, the outer peripheral surface of the roller 24 comes in line contact with the outer peripheral surface of the rack shaft with a high precision.

Similarly, in the second embodiment, the cross-sectional configuration (radius R1) of the outer peripheral surface of the roller 24 that has been plastically deformed is shown in FIG. 2. The outer peripheral surface of the roller 24 and the outer peripheral surface of the rack shaft 15 come in line contact with each other in areas of portions C and D. A portion E is a groove that is defined in the roller 24 in advance.

The surface hardening treatment of the outer peripheral surface of the above roller 24 is conducted by a method such as a known carburization quenching or a nitriding treatment as in the first embodiment. It is desirable that the thickness of the hardened layer is about 0.1 to 0.6 mm, and it is undesirable that the hardened layer is too thick because plastic deformation is difficult.

Similarly, in the second embodiment, the contact area of the outer peripheral surface of the roller with the outer peripheral surface of the rack shaft increases, thereby making it possible to reduce the contact surface pressure. As a result, it is possible to suppress the wear of the contact surface, prevent an increase in the excessive rack guide movable amount, and prevent rattle noise from occurring.

Third Embodiment

A third embodiment is similar in the configuration to the rack and pinion type steering device 10 having the rack guide of the rolling type according to the first embodiment, and only a method of plastically deforming the configuration of the outer peripheral surface of the roller 24 is different from the methods of the first and second embodiments. Accordingly, the configuration of the rack and pinion type steering device having the rack guide is omitted from the detailed description with the first embodiment shown in FIG. 1, and only differences will be described.

Figure 7:
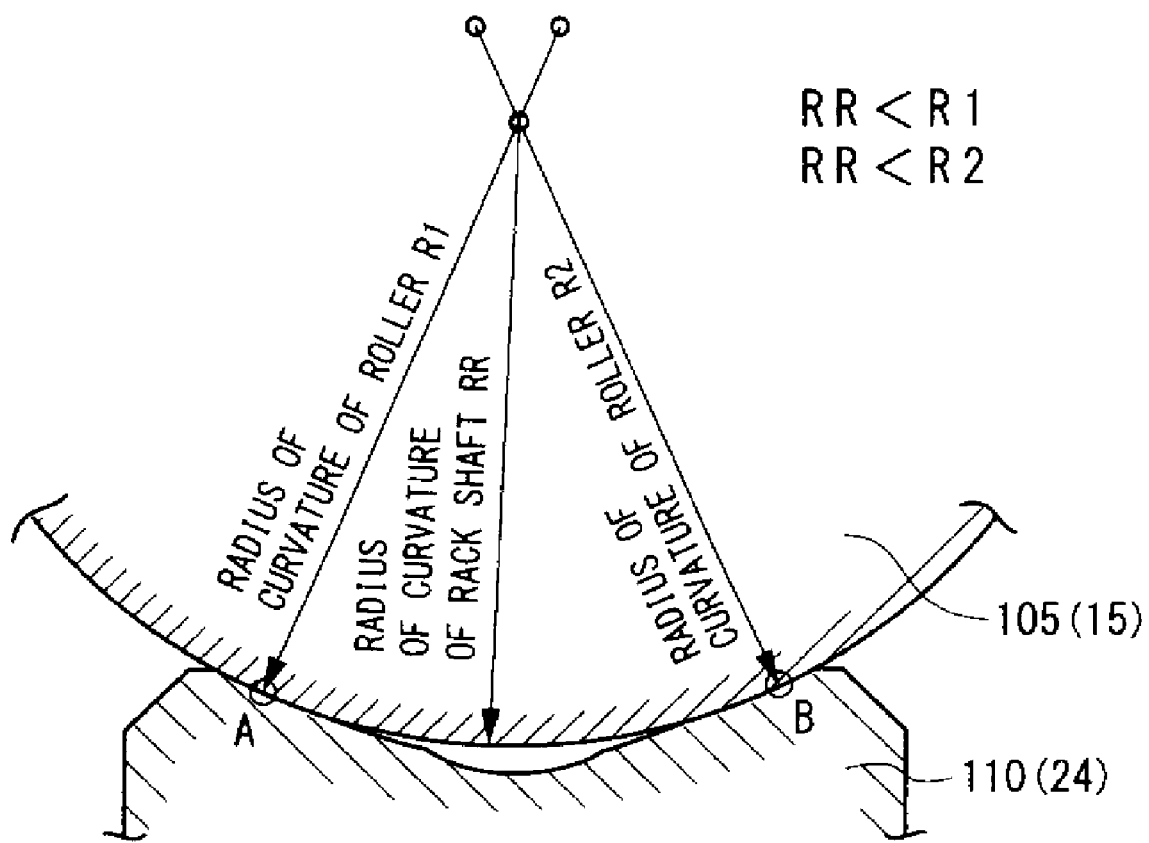
FIG. 7 is a diagram for explaining the cross-sectional configuration of the outer peripheral surface of the roller in the conventional art, and the cross-sectional configuration of the outer peripheral surface of the roller which has not yet been plastically deformed according to the first embodiment.

The cross-sectional configuration of the outer peripheral surface of the roller 24 which has not yet been plastically deformed according to the third embodiment is identical with the conventional cross-sectional configuration shown in FIG. 7, and also identical with the configuration of the outer peripheral surface which has not yet been plastically deformed according to the first embodiment. That is, the cross-sectional configuration of the outer peripheral surface of the roller 11 is formed of a curved surface consisting of two circular arcs with curved surfaces R1 and R2 (R1 can be equal to R2) having the radius of curvatures larger than the radius of curvature RR which is the cross-sectional configuration of the outer peripheral surface of the rack shaft 15. For that reason, the outer ring of the roller 24 and the outer peripheral surface of the rack shaft 15 come in contact with each other at only points A and B.

In the third embodiment, the configuration of the outer peripheral surface of the roller 24 is first formed into the cross-sectional configuration shown in FIG. 7, and the outer peripheral surface is surface hardened by known appropriate means.

Figure 4:
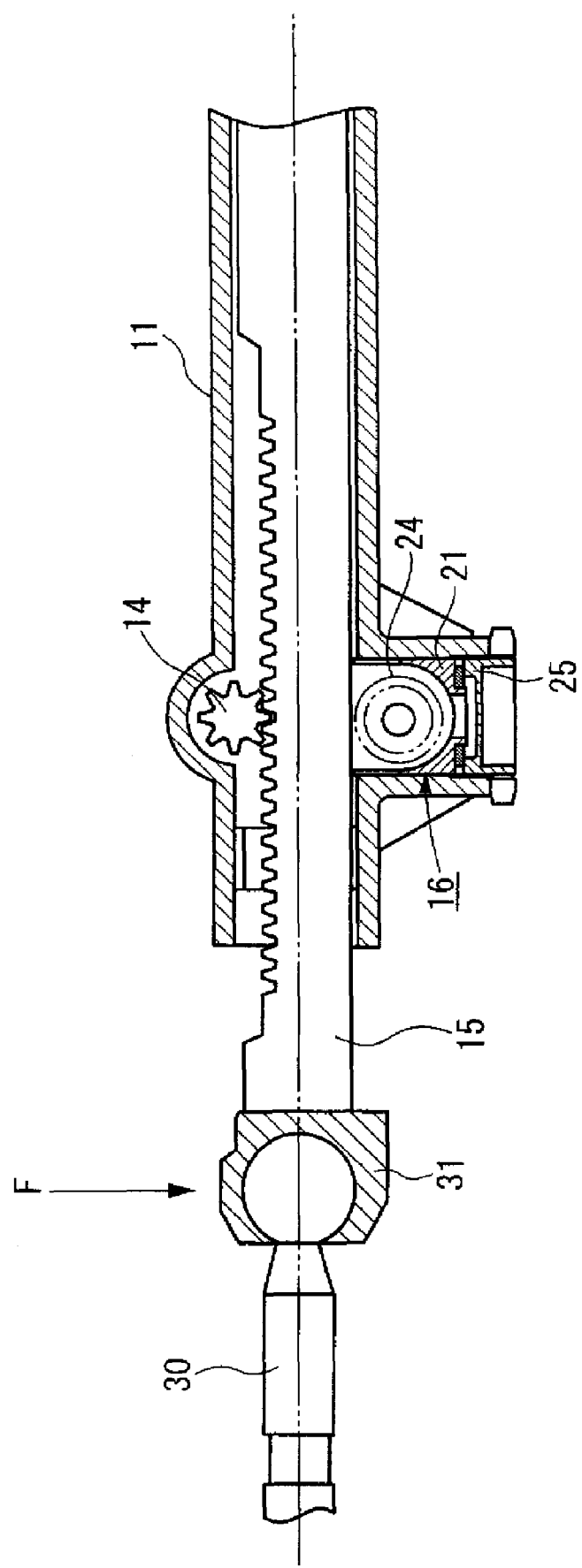
FIG. 4 is a diagram for explaining a method of plastically deforming the outer peripheral surface of the roller according to a third embodiment.
Figure 5:
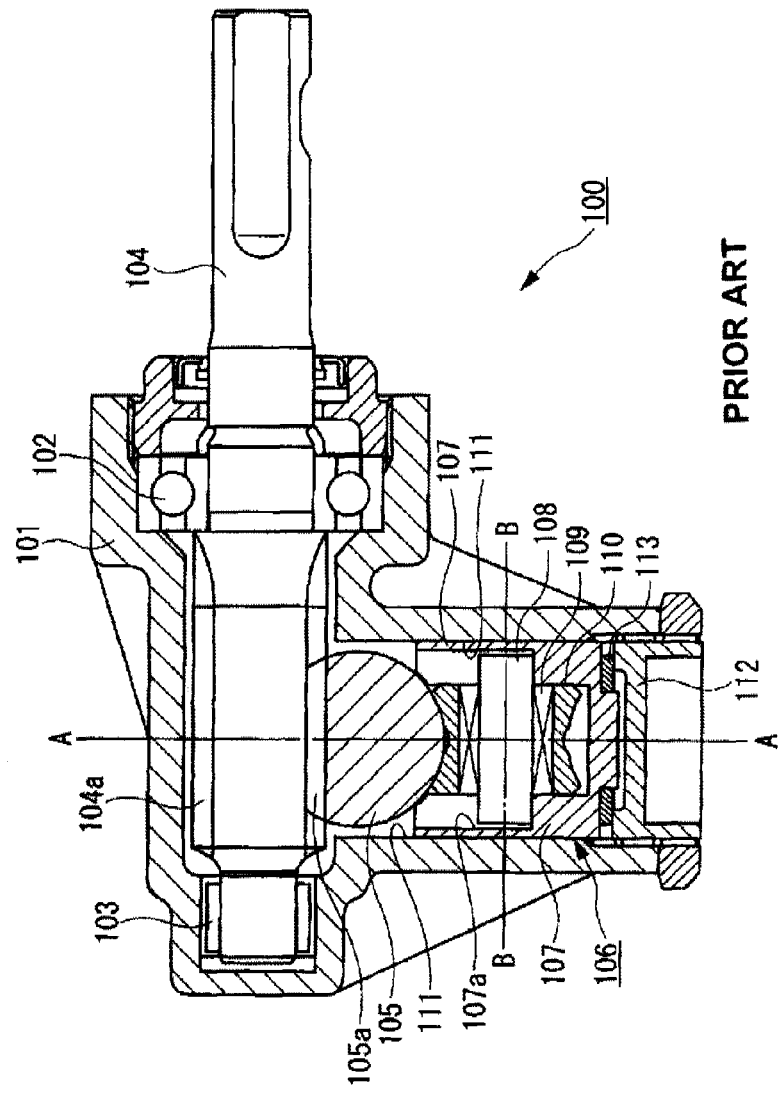
FIG. 5 is a cross-sectional view for explaining an example of the configuration of a conventional rack and pinion type steering device having a rack guide of a rolling type.
Figure 6:
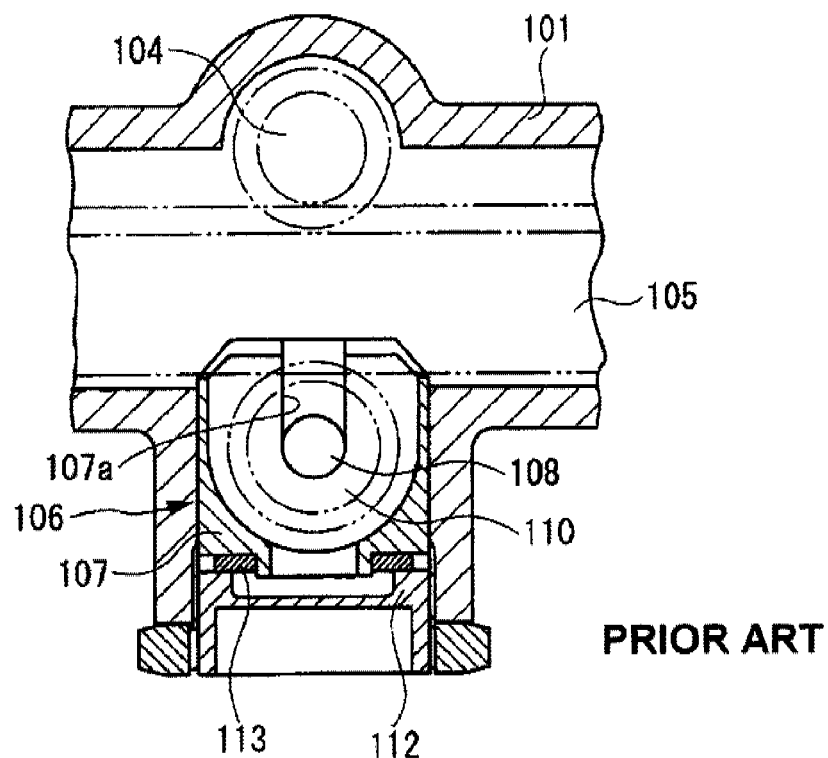
FIG. 6(*a*) is a cross-sectional view taken along a line A-A of FIG. 5.
Figure 6:
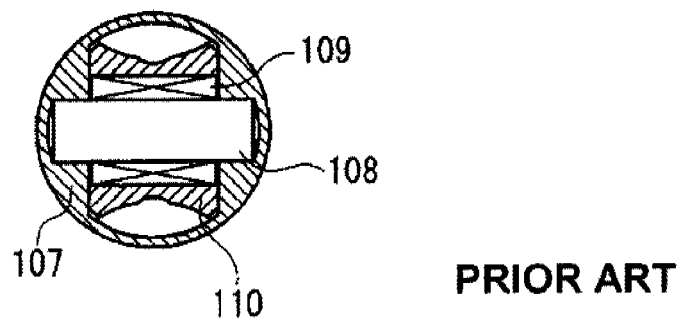

Then, as shown in FIG. 4, a load F is applied to the end of the rack shaft 15 to press the rack shaft 15 toward the roller 24 within the rack guide holder 21. Since FIG. 1 shows a state in which the rack shaft 15 is disposed perpendicularly to the paper surface, the end of the rack shaft 15 is disposed on a front side from the paper surface.

In FIG. 4, a load is applied to a ball joint 31 that is a coupling portion of the end of the rack shaft 15 with the tie rod 30. Alternatively, the load F can be applied directly to the end of rack shaft 15. The significant matter resides in that the rack shaft 15 is pressed toward the roller 25 within the rack guide holder 21.

The rack shaft 15 is reciprocated in the axial direction under a state where the excessive load more than that originally supplied is supplied to the rack guide holder 21, thereby plastically deforming the outer peripheral surface of the roller 24 into the configuration of the outer peripheral surface of the rack shaft 15 so as to follow the outer peripheral surface of the rack shaft. The plastic deformation makes the cross-sectional configurations (radii R1 and R2) of the outer peripheral surface of the roller 24 coincide with the cross-sectional configuration (radius RR) of the outer peripheral surface of the rack shaft (R1=R2=RR). As a result, the outer peripheral surface of the roller 24 comes in line contact with the outer peripheral surface of the rack shaft with a high precision.

Similarly, in the third embodiment, the cross-sectional configuration (radius R1) of the outer peripheral surface of the roller 24 that has been plastically deformed is shown in FIG. 2. The outer peripheral surface of the roller 24 and the outer peripheral surface of the rack shaft 15 come in line contact with each other in areas of portions C and D. A portion E is a groove that is defined in the roller 24 in advance.

The surface hardening treatment of the outer peripheral surface of the above roller 24 is conducted by a method such as a known carburization quenching or a nitriding treatment as in the first and second embodiments. It is desirable that the thickness of the hardened layer is about 0.1 to 0.6 mm, and it is undesirable that the hardened layer is too thick because plastic deformation is difficult.

In the above third embodiment, the cross-sectional configuration of the outer peripheral surface of the roller 24 which has not yet been plastically deformed is described as the conventional cross-sectional configuration shown in FIG. 7, and the cross-sectional configuration of the roller 24 according to the first embodiment which has not yet been plastically deformed shown in FIG. 7. Alternatively, the cross-sectional configuration can be formed in the cross-sectional configuration of the roller 24 according to the second embodiment shown in FIG. 3 which has not yet been plastically deformed.

Similarly, in the third embodiment, the contact area of the outer peripheral surface of the roller with the outer peripheral surface of the rack shaft increases, thereby making it possible to reduce the contact surface pressure. As a result, it is possible to suppress the wear of the contact surface, prevent an increase in the excessive rack guide movable amount, and prevent rattle noise from occurring.

As has been described above, according to the rack and pinion type steering device of the present invention, the outer peripheral surface of the roller that is rotatably installed on the rack guide is formed around the rotating axis in the hand drum configuration. The outer peripheral surface of the hand drum shape has a configuration that comes in line contact with the outer peripheral surface on the opposite side of the meshed surface of the rack surface with the pinion. More specifically, the cross-sectional configuration of the hand drum shaped outer peripheral surface of the roller is formed with a curvature identical with the curvature of the cross-sectional configuration of the outer peripheral surface on the opposite side of the meshed surface of the rack shaft with the pinion.

With the above configuration, the contact area of the outer peripheral surface of the roller with the outer peripheral surface of the rack shaft increases, thereby making it possible to reduce the contact surface pressure. As a result, it is possible to suppress the wear of the contact surface, prevent an increase in the excessive rack guide movable amount, and prevent rattle from occurring.

Also, according to the method of manufacturing the rack and pinion type steering device of the present invention, after the roller that is rotatably installed on the rack guide is formed with the hand drum shaped outer peripheral surface having a curvature different from the curvature of the outer peripheral surface on an opposite side of the meshed surface of the rack shaft with the pinion, the rack shaft is reciprocated in the axial direction and plastically deformed while the rack shaft is pressed toward the hand drum shaped outer peripheral surface, and the hand drum shaped outer peripheral surface of the roller is formed in the configuration that comes in line contact with the outer peripheral surface of the rack shaft.

In the outer peripheral surface of the roller that has been manufactured by the manufacturing method, the hand drum shaped outer peripheral surface of the roller and the outer peripheral surface of the rack shaft come in line contact with each other with a high precision. With the above configuration, the contact area of the outer peripheral surface of the roller with the outer peripheral surface of the rack shaft increases, thereby making it possible to reduce the contact surface pressure. As a result, it is possible to suppress the wear of the contact surface, prevent an increase in the excessive rack guide movable amount, and prevent rattle from occurring.

Then, since the hand drum shaped outer peripheral surface of the roller is plastically deformed so as to follow the outer peripheral surface of the rack shaft, the outer peripheral surface of the roller can come in line contact with the outer peripheral surface of the rack shaft with a high precision without conducting a precise current work, and the treatment of the hand drum shaped outer peripheral surface of the roller can be easily conducted with a high precision.

INDUSTRIAL APPLICABILITY

In the rack and pinion type steering device having the rack guide which can prevent the rattle noise from occurring and the method of manufacturing the steering device, a contact state of the outer peripheral surface of the rack shaft with the outer peripheral surface of the roller of the rack guide holder changes from a point contact to a line contact to enlarge the contact area and reduce the contact surface pressure. With the above configuration, it is possible to prevent the wear of the contact surface, prevent an increase in the excessive rack guide movable amount, and prevent rattle noise from occurring. Also, the treatment of the hand drum shaped outer peripheral surface of the roller can be easily conducted with a high precision.

What is claimed is:

1. A method of manufacturing a rack and pinion type steering device comprising a rolling type rack guide including a rack guide holder that presses a back surface of a rack shaft toward a meshed surface of a rack and a pinion by the aid of a roller, the roller having a hand drum shaped outer peripheral surface which is rotatably installed on a pin which is disposed in a pin insertion groove of the rack guide holder, the method comprising the steps of:

forming the hand drum shaped outer peripheral surface of the roller with a curvature different from a curvature of an outer peripheral surface of the rack shaft opposite a meshed surface of the rack shaft, pressing the rack shaft toward the formed hand drum shaped outer peripheral surface of the roller, and reciprocating the rack shaft in the axial direction causing the roller to rotate and the hand drum shaped outer peripheral surface of the roller to be plastically deformed, whereby the hand drum shaped outer peripheral surface of the roller is formed in a configuration that comes in line contact with the outer peripheral surface of the rack shaft opposite the meshed surface of the rack shaft.

2. A method of manufacturing a rack and pinion type steering device according to claim 1, wherein the roller is formed to have a hand drum shaped outer peripheral surface having a curvature larger than the curvature of the outer peripheral surface on the opposite side of the meshed surface of the rack shaft with the pinion, and a face hardening treatment is conducted before the hand drum shaped outer peripheral surface of the roller is plastically deformed into a configuration that comes in line contact with the outer peripheral surface on the opposite side of the meshed surface of the rack shaft.

3. A method of manufacturing a rack and pinion type steering device according to claim 1, wherein the roller is formed to have a hand drum shaped outer peripheral surface having a curvature smaller than the curvature of the outer peripheral surface on an opposite side of the meshed surface of the rack shaft with the pinion, and a face hardening treatment is conducted before the hand drum shaped outer peripheral surface of the roller is plastically deformed into a configuration that comes in line contact with the outer peripheral surface on the opposite side of the meshed surface of the rack shaft.

4. A method of manufacturing a rack and pinion type steering device according to claim 1, wherein during the step of plastic deformation of the hand drum shaped outer peripheral surface of the roller the rack guide is pressed toward the rack shaft.

5. A method of manufacturing a rack and pinion type steering device according to claim 1, wherein the plastic deformation of the hand drum shaped outer peripheral surface of the roller is conducted by pressing the rack shaft toward the rack guide by applying a load to an end of the rack shaft.

6. A method of manufacturing a rack and pinion type steering device according to claim 1, wherein a face hardening treatment is conducted before the hand drum shaped outer peripheral surface of the roller is plastically deformed into a configuration that comes in line contact with the outer peripheral surface of the rack shaft opposite the meshed surface of the rack shaft.

7. A method of manufacturing a rack and pinion type steering device according to claim 6, wherein the hand drum shaped outer peripheral surface of the roller is formed to have a curvature larger than the curvature of the outer peripheral surface of the rack shaft opposite the meshed surface of the rack shaft.

8. A method of manufacturing a rack and pinion type steering device according to claim 6, wherein the hand drum shaped outer peripheral surface of the roller is formed to have a curvature smaller than the curvature of the outer peripheral surface of the rack shaft opposite the meshed surface of the rack shaft.

9. A method of manufacturing a rack and pinion type steering device according to claim 1, wherein during the step of reciprocating the rack shaft in the axial direction the rack guide is pressed toward the rack shaft.

10. A method of manufacturing a rack and pinion type steering device according to claim 1, wherein during the step of reciprocating the rack shaft in the axial direction the rack shaft is pressed toward the rack guide by applying a load to an end of the rack shaft.

* * * * *